May 25, 1943.　　　H. T. LAMBERT　　　2,320,286
BRAKE CONSTRUCTION AND ADJUSTING MEANS THEREFOR
Filed Nov. 7, 1941　　　3 Sheets-Sheet 1

Inventor
H. T. Lambert
By Robt A Robt
Attorneys.

May 25, 1943. H. T. LAMBERT 2,320,286
BRAKE CONSTRUCTION AND ADJUSTING MEANS THEREFOR
Filed Nov. 7, 1941 3 Sheets-Sheet 3

Inventor
H.T.Lambert
By Robb & Robb
Attorney

Patented May 25, 1943

2,320,286

UNITED STATES PATENT OFFICE 2,320,286

BRAKE CONSTRUCTION AND ADJUSTING MEANS THEREFOR

Homer T. Lambert, St. Joseph, Mich., assignor to The Lambert Brake Corporation, St. Joseph, Mich., a corporation of Michigan Application November 7, 1941, Serial No. 418,256

4 Claims. (Cl. 188—72)

This invention relates to power transmission, and more particularly, to disc brake constructions of the self-energizing or servo-acting type wherein power is absorbed or dissipated to retard or interrupt motion of a moving part. While the invention has been developed primarily for use as a hydraulic or fluid-operated type of brake for automotive vehicles, including automobiles, tractors, and the like, many of its features will be found to be equally useful for other applications and industrial adaptations involving transmission or absorption of power.

In self-energizing or servo-acting disc brakes, the brake construction usually includes a friction disc which is suitably connected with the rotatable part to be braked, for rotation therewith, and one or more additional discs, including a primary actuator disc which is axially movable towards and away from the first mentioned friction disc, and also rotatable relative thereto to a limited extent. This axial and relative rotatable movement of the second mentioned actuator disc is generally obtained through provision of camming instrumentalities interposed between the primary actuator disc and a power plate or other stationary part of the brake. The camming instrumentalities which I have found most satisfactory and efficient, have the form of opposed pairs of cam inserts which are provided with inclined cam surfaces, said cam inserts being arranged in spaced relation about the central axis of the brake assembly, in the primary actuator disc and power plate, respectively, with a ball or roller disposed between the respective inserts of each opposed pair, so that when the primary actuator disc is axially thrust into engagement with the rotating friction disc aforesaid by an initial braking force suitably applied thereto, a limited relative rotation will be automatically imparted to the primary actuator disc, which in turn moves the primary actuator disc into closer engagement with the friction disc by the rolling action of the balls or rollers upon the cam surfaces of the cam inserts, in the manner of a self-energizing or servo action.

The improvements which constitute the present invention, principally have to do with a novel and improved adjusting means to facilitate the taking up of wear of the brake parts and to effect adjustment of the cooperating rotatable and relatively movable disc members.

To these ends I preferably provide adjusting means for each pair of opposed cam inserts, which adjusting means are adjustable independently of each other and are conveniently accessible exteriorly of the brake assembly. In its preferred embodiment, the adjusting means aforesaid has the form of thrust screw means for axially adjusting the position of at least one cam insert of each opposed pair of inserts.

Another object of the invention is to provide an improved power plate assembly wherein the usual wheel mounting for an automobile and the brake mounting are constructed as an integral unit, which reduces the number of parts required for the brake assembly, and hence simplifies the construction, reduces the cost of manufacture, and reduces the weight of the brake assembly as a whole.

A still further object of the invention is to provide an improved brake assembly, wherein provision is made for maintaining and assuring perfect centralization of the primary actuator disc relative to the central axis of the brake assembly, which, in turn assures efficient and effective cooperation of the servo-operated camming instrumentalities and the adjusting means therefor. In the case of a fluid-operated type of brake construction, the centralizing means is preferably also utilized to insulate the pressure fluid seal against undue deterioration or damage by transfer of excessive heat thereto from the friction parts of the brake.

Other and further objects and advantages of the invention will be hereinafter described, and the novel features thereof defined by the appended claims.

In the drawings:

Figure 4 is a detail view in side elevation of one form of adjusting means for the brake;

Figure 5 is an end elevation of the adjusting means of Figure 4;

Figure 6 is a fragmentary detail sectional view of a modified form of brake adjusting means which may be substituted for the form shown in Figures 4 and 5.

Figure 1:
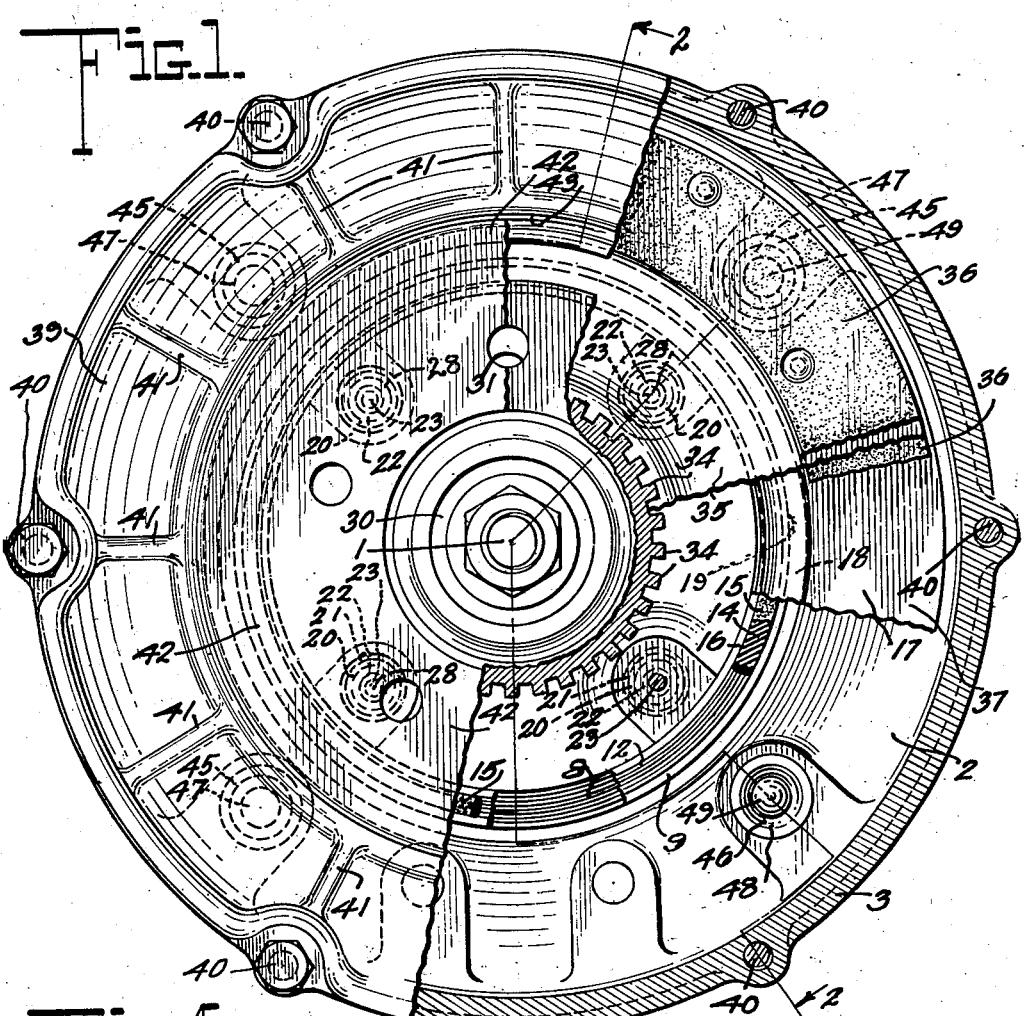
Figure 1 is a view in elevation of a brake assembly constructed according to one embodiment of my invention as applied to an automobile front wheel mounting, certain parts of the assembly being broken away and shown in section to better reveal the internal parts of the assembly.

Like reference characters designate corresponding parts in the several figures of the drawings, wherein 1 denotes a spindle as provided for a front wheel mounting of an automobile. The base of the spindle is preferably constructed as an integral part of a disc 2 which will be hereinafter referred to as the power disc or plate of the brake assembly. This power disc 2 is provided with an annular flange 3 which projects axially therefrom and generally parallel to the central axis of the spindle 1, and forms with the power disc 2 a housing for the brake assembly. Integrally formed with the power disc 2, at the side opposite to the spindle 1, are the usual upper and lower spindle lugs 4 and 5, respectively, to receive the usual king bolt 6 of a conventional axle mounting or knuckle spring mounting (not shown). The power disc is also preferably provided with a plurality of angularly spaced, radially extended webs or ribs 7 which serve to reinforce the power disc and also to aid in dissipating the heat generated by friction during the braking action produced by the brake.

The power disc 2 is formed at its outboard side with an annular groove 8 in which is arranged an annular pressure fluid channel ring 9 as customarily provided in a hydraulic or fluid-operated type of brake. Integrally formed with the channel ring 9 is a hose or pipe connecting boss 10 having a fluid passage 11 leading therethrough to the base of the fluid channel 12 in the channel ring 9. The connecting boss is axially extended through a suitable opening provided therefor in the power disc 2 so that the same may be conveniently connected, as by a threaded connection, with the usual fluid pressure inlet hose or pipe 13. Disposed in the fluid channel 12 of the channel ring 9 is an annular fluid seal 14 which may be formed of rubber or any other material suitable for sealing hydraulic pressure.

Also mounted in the fluid channel 12, next to the fluid seal 14, is a ring 15 which is preferably formed of asbestos or other heat insulating material which is capable of reducing the transfer of heat from the friction parts of the brake to the fluid seal 14. I have found that the use of this insulating ring 15 is of considerable advantage in that it will preserve the rubber sealing ring 14 against deterioration and increase its normal life about tenfold.

As will be best seen from reference to Figure 2 of the drawings, the inner wall 16 of the annular fluid channel ring 9 is axially extended somewhat beyond its outer wall, and substantially beyond the outboard face of the power disc 2, for a purpose which will be hereinafter apparent. Arranged within the housing afforded by the flanged power disc 2 is a primary actuator disc 17. This actuator disc 17 is provided at its side adjacent to the fluid channel ring 9 with an axially offset annular flange 18, forming an annular shoulder 19 which bears upon the exterior face of the insulating ring 15. Thus the primary actuator disc 17 is principally supported by the insulating ring 15 which additionally serves to centralize the actuator disc and to maintain perfect centralization of the same during operation of the brake.

The primary actuator disc 17 is free to turn on the supporting and insulating ring 15 to a limited extent, as will hereinafter more fully appear, and this disc is normally spring-pressed towards the power disc 2 under the influence of a plurality of springs 20 arranged in sockets formed in the inboard side of the power disc and equally spaced from each other about the central axis of the brake assembly. The base of each spring socket 21 is apertured at 22 to loosely receive a pin 23. The outer end of each pin 23 is loosely extended through an aperture 24 in the primary actuator disc 17, and is provided with an enlarged head 25 on its outer end to seat against the outer face of the actuator disc, which is preferably recessed at 26 to form a seat for the head 25. As seen in Figure 2 of the drawings, the spring 20 encircles the pin 23 and seats at one end against the base of the spring socket 21. The opposite end of the spring abuts a retainer collar 27 arranged on the pin 23 next to the head 28. The head 28 is preferably T-shaped, and the spring retainer collar 27 is preferably provided with an elongated slot, which, when aligned with the head 28, permits removal of the retainer collar over the head 28 to facilitate dismounting of the primary actuator disc 17 from the brake assembly should occasion require. By passing the retainer collar 27 over the head 28 of the pin 23, and then turning the retainer collar relative to the head, the retainer collar can be quickly interlocked with the pin 23 to prevent its displacement, and to place the spring 20 under sufficient compression to cause the primary actuator disc 17 to be yieldably stressed towards the power disc 2, while at the same time, permitting axial movement of the primary actuator disc away from the power disc responsive to the application of a braking force to the brake through means of the pressure fluid admitted into the fluid channel 12 in the conventional manner.

The spring sockets 21 are preferably closed at their inboard ends by removable caps 29 which serve to protect the springs 20 and the other operating parts associated therewith, from dirt and other foreign matter which might otherwise interfere with the operation of the brake. By removing the caps 29, the detachable retainer collars 27 are readily accessible to permit disconnection of the primary actuator disc 17 from the power disc 2.

Rotatably mounted upon the spindle 1 is a wheel hub 30 which is provided with the usual bolt openings 31 for attaching the conventional automobile wheel (not shown) thereto. Anti-friction bearings are shown at 32 and 33 respectively between the wheel hub 30 and its mounting spindle 1, these bearings being conventional and forming no part of the present invention. The inner end of the wheel hub is preferably splined at 34, as best seen in Figures 1 and 2. Mounted upon the splined portions of the wheel hub, and having corresponding splines for engagement with the splines 34 on the hub, is a friction disc 35, said friction disc being preferably provided on its opposite faces at its outer periphery with suitable friction linings 36. The friction lining 36 on one side of the friction disc 35 is engageable with the braking surface 37 on the outboard side of the primary actuator disc 17, and the friction lining on the opposite side of the friction disc 35 is engageable with the braking surface 38 on the inboard side of a further brake disc or ring 39 which is fixedly attached to the edge of the flange 3 of the power disc 2, as by means of the bolts 40. This brake ring 39 is likewise preferably provided with reinforcing and heat dissipating ribs or webs 41.

To prevent entrance of dirt and other foreign matter into the brake assembly at the outboard side thereof, I preferably provide a flanged ring 42 which is suitably attached to the flange 43 of the wheel hub 30. The free extremity of the flanged edge of the ring 42 preferably seats in an annular recess 44 provided in the outer face of the brake ring 39 to more effectively seal the ring 42 about the brake ring 39.

Figure 2:
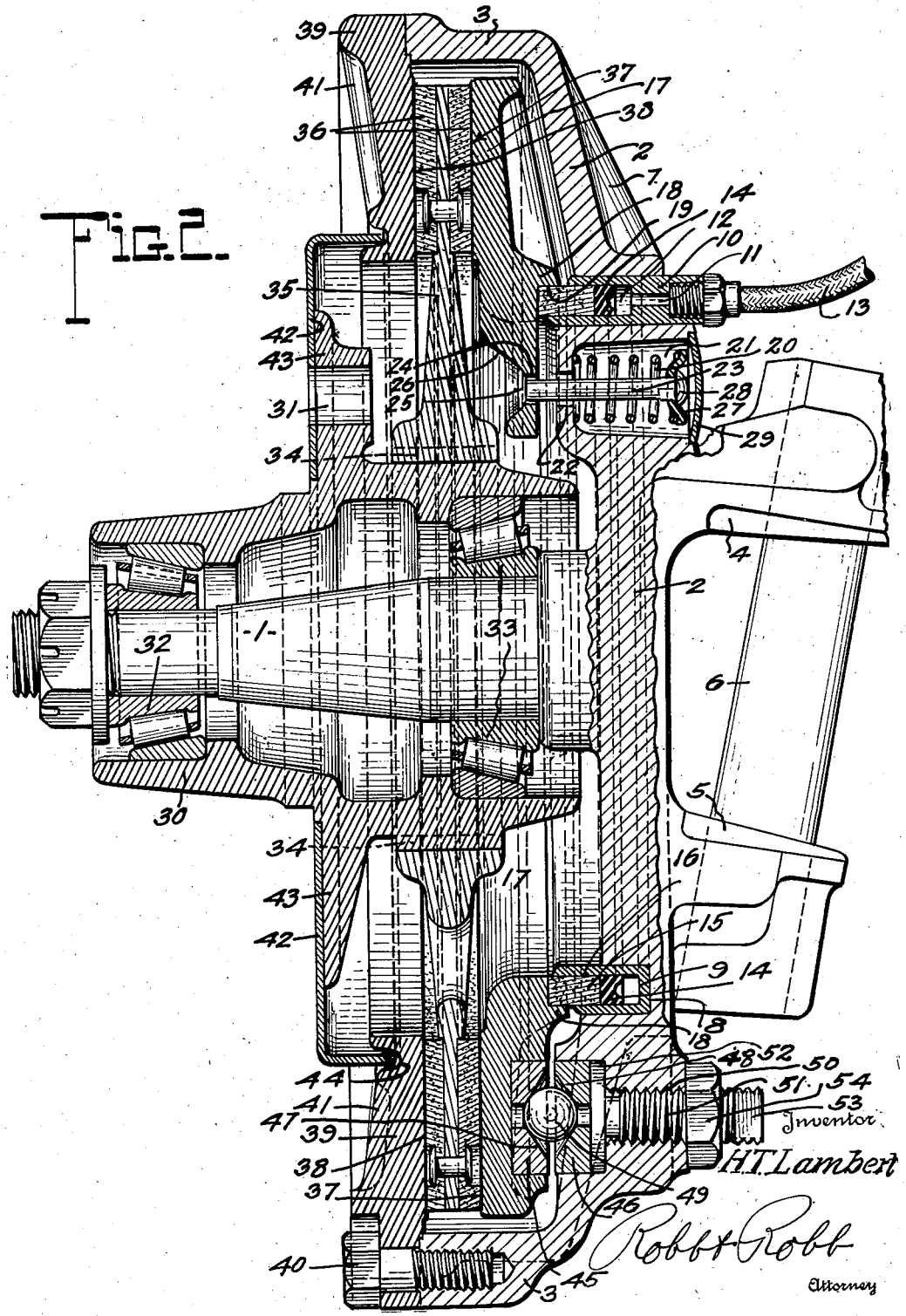
Figure 2 is a sectional view taken on the line 2—2 of Figure 1.
Figure 3:
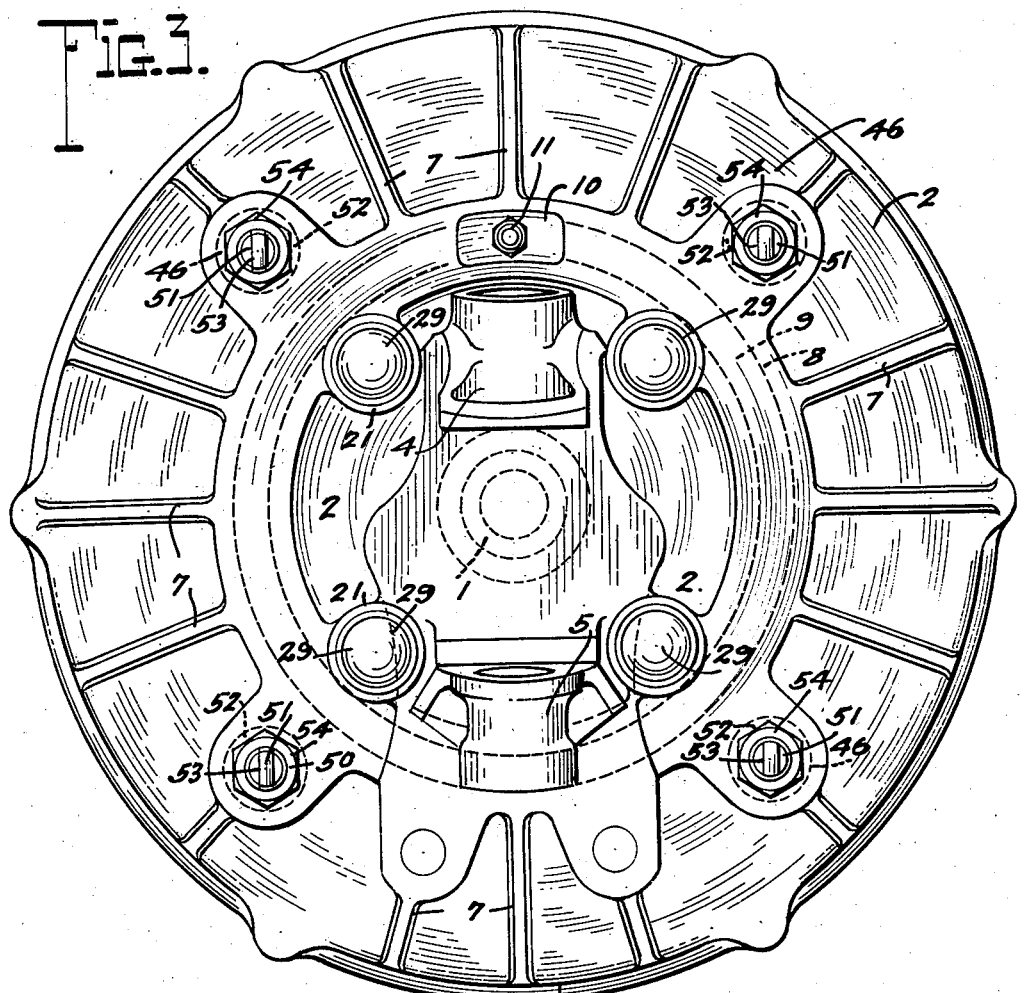
Figure 3 is a view in elevation as seen from the reverse side of the brake assembly in Figure 1.
Figure 7:
Figure 7 is a side view of the spring retainer collar showing the head of the spring retainer pin in cooperative relation therewith.

Referring particularly to Figure 2 of the drawings, it will be understood that when the wheel (not shown) which is attached to the wheel hub 30 is freely rotating, without the application of a braking force to the wheel, the friction disc 35, which has a splined connection with the wheel hub, will freely rotate between the brake ring 39 and the primary actuator disc 17, with their respective braking surfaces normally out of frictional contact by reason of urging of the primary actuator disc 17 towards the power disc 2 and away from the brake ring 39, pursuant to the yieldable pressure of the springs 20. It will be understood, of course, that although the friction disc 35 is operatively connected with the wheel hub 30 for rotation therewith, the friction disc is free to move axially on the hub without disturbing the splined driving connection between these parts.

To obtain a self-energizing or servo action, I provide the primary actuator disc 17 and the power disc 2 respectively, with a plurality of inserts 45 and 46 having opposed camming surfaces 47, 48. The inserts 45 and 46 are arranged in opposed pairs, with the pairs of inserts spaced equi-distantly apart about the central axis of the brake assembly. Interposed between the inserts of each pair, I provide a ball 49 or other rolling instrumentality which cooperates with the cam surfaces of the respective inserts to cam the primary actuator disc 17 axially away from the power disc 2 on relative rotation between the primary actuator disc and the power disc. This camming action takes place automatically in the operation of the brake and may be briefly explained as follows.

On applying the brake by admitting pressure fluid into the fluid channel 12, the primary actuator disc 17 is axially moved away from the power disc 2 responsive to the pressure of the pressure fluid against the axially movable rings 14 and 15, the latter of which abuts the primary actuator disc 17, thereby causing the braking surface of the primary actuator disc to engage the friction lining 36 on the friction disc 35, and also causing frictional engagement of the friction lining 36 on the opposite side of the friction disc 35, with the braking surface of the brake ring 39. As the initial frictional engagement of these brake parts takes place a limited rotary movement is imparted to the primary actuator disc 17, which is permitted by the yieldably mounting of the primary actuatory disc 17 upon the power disc 2, while at the same time the primary actuator disc is maintained perfectly centralized by means of the insulating ring 15 on which it is free to turn. As this limited rotary movement of the primary actuator disc 17 takes place, the balls 49 or other rolling instrumentalities as the case may be, roll upon the cam surfaces of the opposed pairs of cam inserts 45 and 46, thereby producing a further axial movement of the primary actuator disc 17 away from the power disc 2, and increasing the frictional engagement between the friction disc 35 and the braking surfaces of the primary actuator disc and brake ring 39 to effectively create a powerful braking action upon the friction disc 35 and the wheel hub 30 which carries the wheel to be braked. The braking action is smooth and highly efficient with a minimum application of initial braking force, which is characteristic of disc brakes of this type.

In order to take up wear of the brake linings and braking surfaces of the discs, I preferably provide, according to this invention, a very simple and effective adjusting means which will now be more particularly referred to. According to one form of the adjusting means as shown in Figures 2, 4 and 5, the power disc 2 is apertured at 50 opposite to each cam insert 46, the respective apertures leading from the base of each insert socket, through the power disc to the inboard side thereof. These apertures are preferably threaded to receive a thrust screw 51, having at one end an enlarged flat head 52 disposed behind its respective insert 46 in the insert socket. The opposite end of each thrust screw 51 is milled flat at opposite sides, as at 53 to receive a wrench for convenience in turning the thrust screw in opposite directions, according to the adjustment required. Obviously, by rotating the thrust screw 51 in one direction, the cam insert 46 against which the head 52 of the screw bears will be moved towards the opposed cam insert 45 carried by the primary actuator disc 17, thereby forcing the primary actuator disc away from the power disc and closer to the brake ring 39 in the initial position of adjustment of the primary actuator disc, whereas, on rotation of the thrust screw in the opposite direction, the cam insert 46 can be retracted into its socket in the power disc 2, allowing the primary actuator disc to be initially positioned closer to the power disc under the influence of the springs 20. Owing to the provision of one of these thrust screws 51 for each cam insert 46 in the power disc 2, each cam insert can be adjusted independently of the others to assure uniform frictional engagement at the braking surfaces of the brake parts. The thrust screws 51 are conveniently accessible at the inner side of the power disc 2, and each thrust screw is preferably provided with a jam nut 54 to maintain the thrust screws in their adjusted positions.

Where those adaptations of the brake do not afford sufficient clearance for the use of the adjusting instrumentalities just described, a modified form of adjusting device, as shown in Figure 6, may be substituted therefor. This modified construction employs the same principles of adjustment, and contemplates a short thrust screw part 51' arranged in the threaded aperture 50 of the power plate 2, the inner end of the screw part 51' being provided with an enlarged flat head 52' disposed in the cam insert seat or socket 46'. The body of the thrust screw 51' is made hollow, with the walls of the bore 53' shaped to a hexagonal or other irregular form in cross section, to receive a correspondingly shaped adjusting tool which may be employed to rotate the thrust screw 51' in either direction. To maintain the adjustment, after the same has been effected with the aid of the thrust screw 51', I employ a short hollow set screw 54', having the walls of its bore arranged in hexagonal or other form to receive the adjusting tool previously referred to. In this type of construction, the adjustments of the brake can be effected by instrumentalities largely confined within the space occupied by the brake assembly, and without any projections protruding therefrom.

It will be understood that although the foregoing description and the accompanying drawings have reference principally to a front wheel mounting and brake assembly for automobiles, the same is to be taken as illustrative of my invention and without limitation to the specific details, excepting as defined in the appended claims. It will be obvious to those skilled in the art that by suitable modification of the invention, it may be applied to rear wheel mountings and brake assemblies for automobiles, as well as to other uses, hence changes and alterations may be made without departing from the spirit of the invention as defined by the appended claims.

Having thus described my invention what I claim as new and desire to secure by Letters Patent is:

1. In a disc brake, a plurality of brake members having relative axial and rotative movement, one of said brake members being rotatable by a part to be braked, means for producing relative axial movement of said brake members to cause a braking action by frictional engagement thereof, said last named means including axially spaced opposed cam members having oppositely inclined cam surfaces and a rolling member interposed therebetween, one of said opposed cam members being carried by one of said brake members, and means for axially adjusting the other of said opposed cam members to produce a corresponding axial adjustment of the brake member which carries the opposed cam member, comprising a thrust screw having a flat head on the inner end bearing against the face of the last-mentioned cam member and of a surface area corresponding thereto whereby to exert equi-pressure to the cam member surface in adjustment of the cam member to fixed position relative to the cooperating cam member.

2. In a disc brake, a plurality of brake members having relative axial and rotative movement, one of said brake members being rotatable by a part to be braked, means for producing relative axial movement of said brake members to cause a braking action by frictional engagement thereof, said last named means including axially spaced opposed cam members having oppositely inclined cam surfaces and a rolling member interposed therebetween, one of said opposed cam members being carried by one of said brake members, and means for axially adjusting the other of said opposed cam members to produce a corresponding axial adjustment of the brake member which carries the opposed cam member, the axially adjustable cam member being carried by a stationary brake assembly support having a socket provided therein to receive the cam member, and the cam adjusting means comprising an axially adjustable thrust screw threadedly received in the support and having abutting engagement with the cam member through the base of the socket aforesaid, said thrust screw having an enlarged head at its inner end conforming to the cam member and preventing displacement of the screw from the socket in a direction outward of said support.

3. In a fluid-operated disc brake, including brake members having relative axial and rotative movement, a supporting plate disposed at one side of said brake members and yieldably connected with one of said brake members, said supporting plate having an annular pressure fluid channel therein, a resilient fluid sealing member disposed in said channel and serving to transmit pressure to the yieldably connected brake member for imparting axial movement thereto to cause frictional engagement of the brake members, and an annular heat insulating ring interposed between the fluid sealing member and the yieldably connected brake member aforesaid, for substantially preventing the transfer of heat from the brake members to the fluid sealing member, said heat insulating ring being disposed in the pressure fluid channel contiguous to the pressure sealing member, and being axially extended towards the yieldably connected brake member for cooperation with the latter to centralize the same.

4. A disc brake as defined in claim 3, wherein the yieldably connected brake member is provided with an axially extended annular bearing shoulder embracing the annular heat insulating ring.

HOMER T. LAMBERT.